United States Patent [19]

McClure

[11] Patent Number: 4,977,609
[45] Date of Patent: Dec. 11, 1990

[54] INTERFACE CIRCUIT FOR TELECOMMUNICATIONS DEVICES

[75] Inventor: Dana W. McClure, El Toro, Calif.

[73] Assignee: GTE Cellular Communications Corporation, Houston, Tex.

[21] Appl. No.: 263,938

[22] Filed: Oct. 28, 1988

[51] Int. Cl.⁵ .......................... H04B 1/38; H04N 1/00
[52] U.S. Cl. ........................................ 455/89; 455/78; 455/345; 379/59; 379/100; 358/434; 358/442
[58] Field of Search .................... 455/89, 90, 345, 74, 455/78; 379/100, 58–60; 358/256, 434, 435, 442; 364/238.3, 241.9

[56] References Cited

U.S. PATENT DOCUMENTS

| | | | |
|---|---|---|---|
| 4,703,324 | 10/1987 | White | 455/89 |
| 4,823,373 | 4/1989 | Takahashi et al. | 455/84 |
| 4,881,129 | 11/1989 | Mitsuhashi | 455/258 |

Primary Examiner—Donnie L. Crosland

[57] ABSTRACT

An interface circuit which adapts an existing telecommunications device, such as a facsimile machine, to successfully operate through an existing cellular mobile radiotelephone. No significant modifications are required of the telecommunications device or of the cellular mobile radiotelephone. The interface circuit includes circuitry to convert a two-wire communication interface of the telecommunications device into a four-wire communication interface required by the cellular mobile radiotelephone. This circuitry includes a received signal altering circuit which permits controlling side tone cancellation independently of transmitted and received signal gain control. In addition, the interface circuit includes a switchhook status detector which monitors the switchhook state of the telecommunications device to control muting in the cellular mobile radiotelephone. The muting of the cellular mobile radiotelephone prevents contamination of transmitted data from the telecommunications device and protects a user from hearing displeasing sounds associated with handshaking signals and data communication.

29 Claims, 2 Drawing Sheets

INTERFACE CIRCUIT FOR TELECOMMUNICATIONS DEVICES

TECHNICAL FIELD OF THE INVENTION

The present invention relates to Cellular Mobile Radiotelephone (CMR) technology and to the utilization of CMR technology in data transmission, such as may occur, for example, in conjunction with a facsimile machine. More specifically, the invention contemplates an interface circuit for coupling a telecommunications device (facsimile machine) that communicates through a two-wire, bidirectional port to a CMR transceiver that utilizes separate transmit, receive, and signaling ports.

BACKGROUND OF THE INVENTION

CMR technology permits communication between the subscribers of a CMR system and subscribers of the public switched telephone network (PSTN). It has been adapted for use in many different applications. For example, CMR equipment may be utilized in automobiles, in portable enclosures, or in remote locations not hard-wired into the PSTN.

In addition, such CMR equipment may be utilized to communicate data as well as voice. Of course, many diverse telecommunications devices, including facsimile machines, have been manufactured to communicate data through the PSTN using local hard-wired loops thereof. However, such devices cannot directly couple to CMR equipment so as to permit communication through such equipment with other subscribers of the PSTN. In large part, this is because a typical telecommunications device does not adequately simulate a CMR control head to a CMR transceiver. Likewise, a typical CMR transceiver does not adequately simulate a central office to the telecommunications device.

A typical telecommunications device is designed to communicate with the PSTN through a two-wire, bidirectional port. Transmitted audio frequency signals, received audio frequency signals, ringing signals (if utilized), and switchhook status detection signals are all communicated through the two-wire port. On the other hand, typical CMR equipment includes a transceiver, a control head, and a handset. Separate transmit, receive, and control signals travel between the control head and handset on one end of a control cable and the transceiver on another end of this control cable. The conventional two-wire, bidirectional communication standard is not used within such CMR equipment. The CMR transceiver interfaces with the PSTN network through electromagnetic radio frequency communications in a manner that is well understood by those skilled in the art and that is largely incompatible with the above-described two-wire, bidirectional port. Consequently, such a typical telecommunications device is not directly compatible with CMR equipment.

Conventional hybrid circuits which convert two-wire communication into four-wire communication are known to those skilled in the art. Such conventional circuits may utilize inductors, which are highly undesirable due to their cost, tendency to drift, and size requirements. Alternatively, such conventional circuits may require the use of active devices in connection with a resistive bridge structure that operates to cancel out a received signal side tone in a transmitted signal. Such conventional resistive bridge circuits are undesirable because of, inter alia the close tolerances that must be maintained between the associated resistive elements in order to realize the desired cancellation effects. Moreover, a mere hybrid circuit fails to provide a technique for preventing external signals on a transmit leg of a four-wire communication port from contaminating transmission signals derived from a two-wire communication port.

On the other hand, conventional circuits have been constructed which form or thoroughly simulate a telephone network central office to which many telecommunications devices, such as facsimile machines, are designed to couple. While such conventional circuits may work acceptably well in some applications, they tend to be excessively complicated, large, unreliable, and costly for many other applications.

Consequently, a need exists for a simple, inexpensive, reliable circuit that provides sufficient simulation of a central office to a telecommunications device, such as a facsimile machine, to allow such a device to properly operate, while sufficiently simulating a control head to a CMR transceiver.

SUMMARY OF THE INVENTION

Accordingly, it is a advantage of the present invention that a circuit is provided which converts a four-line port, consisting of two, independent, unidirectional ports, into a single, two-line, bidirectional port.

Another advantage of the present invention is that circuitry is provided to control muting in a CMR transceiver so that data communications through the CMR transceiver are not contaminated.

Yet another advantage is that the present invention interfaces a telecommunications device, such as a facsimile machine, for operation through a CMR transceiver.

Still another advantage of the present invention is that a simple circuit which is inexpensive to construct, reliable, requires only a minimal amount of space, and requires no substantial modification of existing conventional telecommunications devices or of a CMR transceiver is provided.

The above and other advantages of the present invention are carried out in one form by a circuit which includes first and second amplifiers, and an amplitude altering device. An input of the first amplifier couples to a receive unidirectional port, and an output of the first amplifier supplies a received signal and couples to a bidirectional port so that the received signal forms at least a component of a line signal present at the bidirectional port. The amplitude altering device couples to the first amplifier so that it alters the amplitude of the received signal without otherwise exerting a significant influence on that signal. The second amplifier has a first input coupled to the amplitude altering device and a second input coupled to the bidirectional port. Moreover, the second amplifier is configured so that the altered received signal that is amplified through its first input substantially cancels the received signal component of the line signal that is amplified through its second input.

The above and other advantages of the present invention are carried out in another form by a circuit which detects an off-hook state of a telecommunications device, such as a facsimile machine. The circuit includes a two-wire, bidirectional port, a voltage reference supply, first and second resistors, and a comparator. The first resistor couples between wires of the two-wire port.

The second resistor couples between a first wire of the two-wire port and the voltage reference supply. A first input of the comparator couples to the first wire of the two-wire port, and a second comparator input is adapted to receive a second reference potential that has a value between the voltage of the voltage reference supply and a voltage exhibited by a second wire of the two-wire port.

BRIEF DESCRIPTION OF THE DRAWINGS

A more complete understanding of the present invention may be derived by referring to the detailed description and the claims when considered in connection with the FIGURES. Throughout the FIGURES like reference numbers refer to similar items, and:

DETAILED DESCRIPTION OF THE PREFERRED EMBODIMENT

Figure 1:
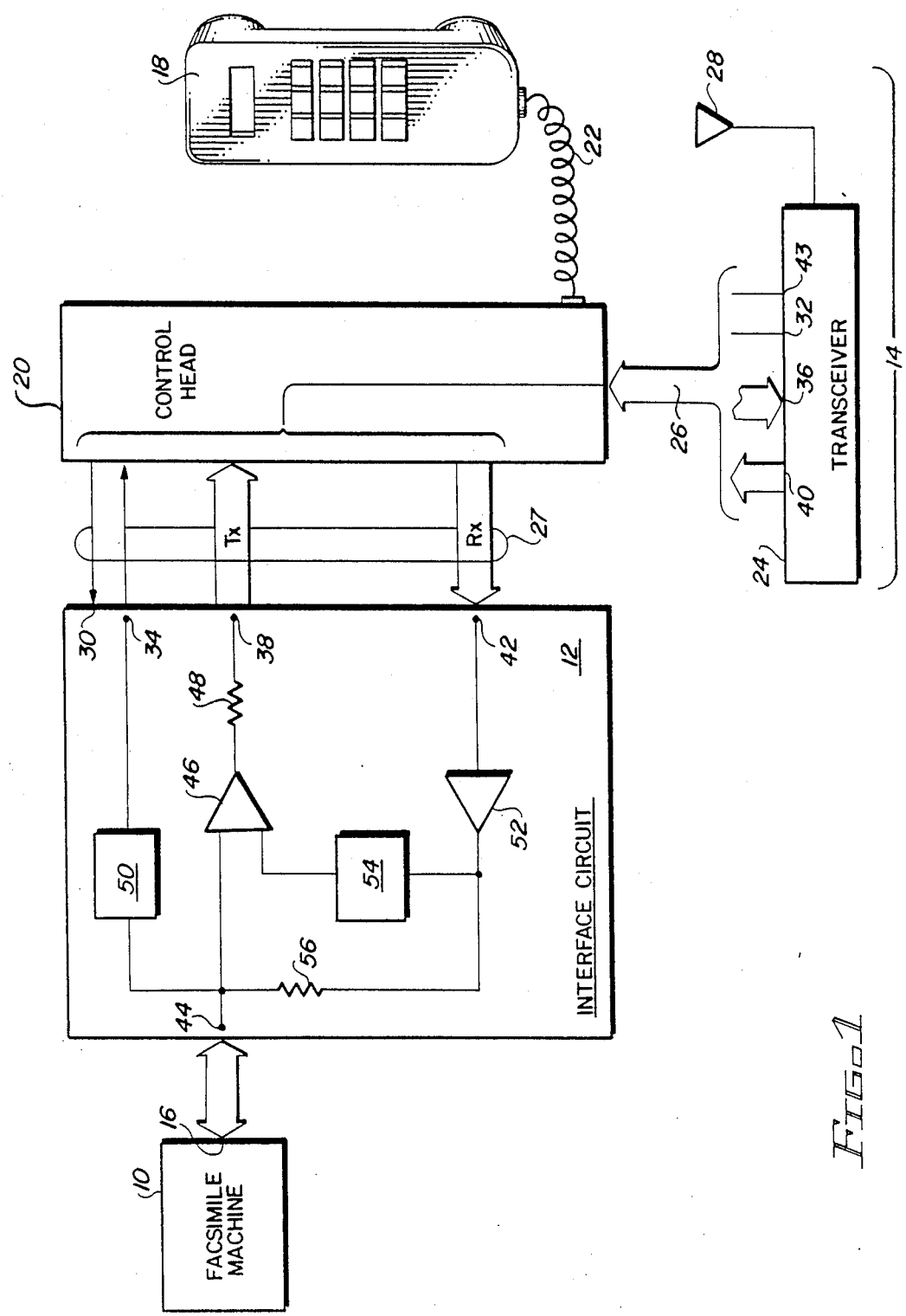
FIG. 1 shows a block diagram of the present invention.

FIG. 1 shows a simplified block diagram of the present invention. Generally speaking, FIG. 1 shows a telecommunications device, such as a facsimile machine 10, which couples through an interface circuit 12 to a cellular mobile radiotelephone (CMR) 14. In the present invention, facsimile machine 10 represents, and may be understood to stand for, any of a wide variety of telecommunications devices which are designed to communicate with other telecommunications devices using standards dictated by the public switched telephone network (PSTN). These standards include the use of a two-wire, bidirectional interface 16 through which all communication with facsimile machine 10 takes place. In other words, all transmitted audio signals, all received audio signals, and all signaling information required for external devices to communicate with facsimile machine 10 are presented through two-wire interface 16. As is well understood to those skilled in the art, transmit and receive signals are conventionally encoded as audio frequency signals at two-wire interface 16.

One item of the signaling information concerns the switchhook status of facsimile machine 10. When facsimile machine 10 is in an on-hook (or "off-line") mode, facsimile machine 10 presents a substantially open circuit to dc current at two-wire interface 16. In this on-hook state, facsimile machine 10 does not communicate with an external device. On the other hand, when facsimile machine 10 is in an off-hook (or "on-line") mode, facsimile machine 10 presents an ac impedance of around 600 ohms and a dc impedance on the order of 100–150 ohms at two-wire interface 16, and facsimile machine 10 may communicate with external devices.

CMR 14 represents a conventional cellular mobile radiotelephone about which a wide variety of technical documentation exists and is available to those skilled in the art. Consequently, CMR 14 is not extensively described herein, but the following document, which may be referred to for a technical description of an exemplary CMR 14, is incorporated herein by reference: "GTE METAL SERIES CELLULAR MOBILE TELEPHONE (MT930)," Publication Reference GTE-MN 1176, available from GTE Mobilnet Incorporated, 616 FM 1960 West, Suite 400, Houston, Tex., 77373.

FIG. 1 shows CMR 14 as including a handset 18 which couples to a control head or control unit 20 through a cable 22. Handset 18 includes a keypad, a display, and audio transducers. Control head 20 includes a cradle or hang-up cup (not shown) for handset 18 and an on-off power switch (not shown) for CMR 14. Control head 20 couples to a CMR transceiver 24 through a control cable 26. Transceiver 24 additionally couples to an antenna 28, through which communication to a mobile telephone switching office (MTSO) and the entire PSTN occurs. Handset 18, cable 22, control head 20, control cable 26, transceiver 24, and antenna 28 all represent conventional portions of a CMR 14.

In addition, a cable 27 couples interface circuit 12 to control head 20. Signals carried by cable 27 couple in parallel with selected signals of cable 26. Specifically, cable 27 provides power signals to interface circuit 12 at a power terminal 30, couples a muting control contact 32 of transceiver 24 to interface circuit 12 at a switchhook terminal 34, couples an audio transmit signal interface 36 to interface circuit 12 at a transmission (TX) port 38, and couples an audio received signal interface 40 of transceiver 24 to a received (RX) port 42 of interface circuit 12. Ports 38 and 42 each represent unidirectional ports, and together ports 38 and 42 constitute a four-wire port. In addition, cable 26 includes signals 43 which couple only between control head 20 and transceiver 24.

Interface circuit 12 adapts CMR 14 to facsimile machine 10 through a two-wire, bidirectional port 44. Port 44 and two-wire interface 16 of facsimile machine 10 couple together through appropriate cabling. Port 44 couples to a first input of a transmit amplifier 46 within interface circuit 12, and an output of transmit amplifier 46 couples through an impedance device 48 to transmission port 38 of interface circuit 12. In addition, bidirectional port 44 couples to an input of a switchhook status detector 50, and an output of switchhook status detector 50 couples to switchhook terminal 34 of interface circuit 12.

Switchhook status detector 50 monitors interface 16 of facsimile machine 10 to detect the switchhook status of facsimile machine 10. A control signal, which controls muting in CMR 14 in response to the switchhook status of facsimile machine 10, is provided to transceiver 24 from interface circuit 12. Specifically, when facsimile machine 10 is on-hook, this control signal has no influence over muting in CMR 14. However, when facsimile machine 10 is off-hook, this control signal causes CMR 14 to mute its handset 18. Consequently, when facsimile machine 10 is off-hook, no extraneous audio signals from handset 18 are summed with a transmitted audio signal output from port 38 of interface circuit 12 to contaminate data communications from facsimile machine 10.

In addition, CMR 14 may block transmission of audio signals to a user of CMR 14 in response to the receipt of this control signal from interface circuit 12. Consequently, the user of CMR 14 is protected from hearing possibly annoying audible sounds that are generated in transmitting handshaking signals and data between facsimile machine 10 and transceiver 24. This muting feature is particularly desirable when CMR 14 is used in a "hands free" mode. In this "hands free" mode handset 18 remains in the control head cradle, and the user "hears" CMR 14 through an external speaker. Thus, the muting feature operates to attenuate, and possibly completly silence, sounds produced at the external speaker. In these circumstances and in the absence of the muting feature, the handshaking signals exchanged prior to the transmission of facsimile data, as well as audible components of the data itself, would necessarily, and undesirably, be heard during facsimile transmission.

Received port 42 of interface circuit 12 couples to an input of a receive amplifier 52. An output of receive amplifier 52 couples to an input of an altering circuit 54 and through a series-connected impedance device 56 to bidirectional port 44. An output of altering circuit 54 couples to a second input of transmit amplifier 46.

A received signal generated by transceiver 24 is amplified in receive amplifier 52 and resistively summed with a line signal appearing at bidirectional port 44 through impedance device 56. Consequently, this received signal forms at least a component of an entire line signal which appears at bidirectional port 44. Transmission amplifier 46 amplifies the line signal appearing at bidirectional port 44. This line signal includes both transmitted and received signal components.

Altering circuit 54 adjusts the amplitude of the received signal generated by receive amplifier 52 so that when this received signal is summed with the line signal in transmit amplifier 46, the received signal component of the amplified line signal has a desired amplitude, such as zero. If an amplitude of zero is chosen, the received signal is cancelled out, and only the transmitted portion of the amplified line signal remains in the transmitted signal output from transmit amplifier 46. However, another amplitude may advantageously be chosen so that a small amount of "side tone" exists in the transmitted signal output from transmit amplifier 46.

Figure 2:
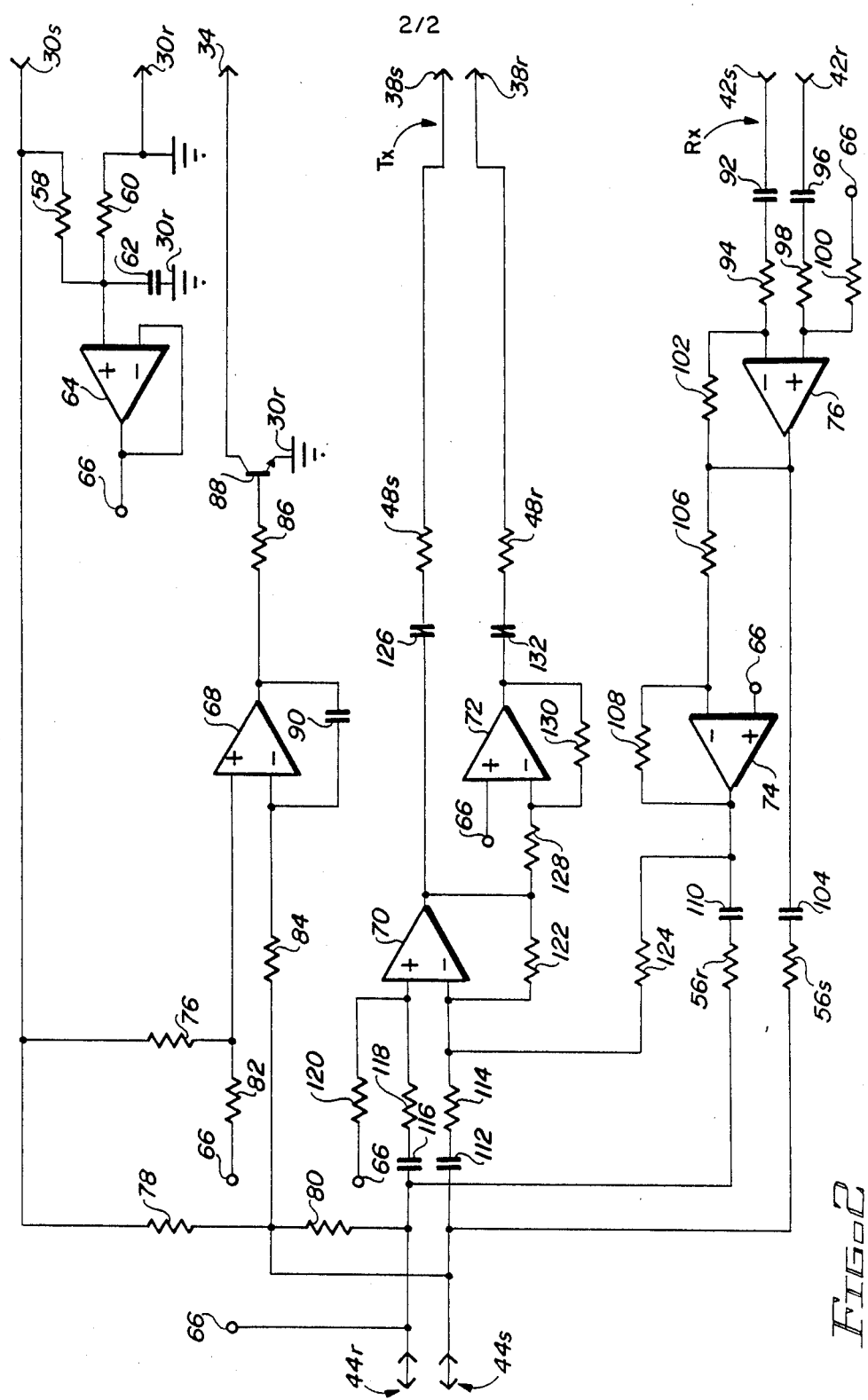
FIG. 2 shows a detailed schematic diagram of the present invention.

FIG. 2 shows a detailed schematic diagram of interface circuit 12. In FIG. 2, power terminal 30 from FIG. 1 is depicted as terminals 30s and 30r. Transceiver 24 (see FIG. 1) supplies terminal 30s with a positive reference potential, which is around +12 Vdc in the preferred embodiment. Terminal 30r receives a ground signal and operates as a ground terminal for interface circuit 12. A voltage divider network consisting of resistors 58 and 60 couples between terminals 30s and 30r. A capacitor 62 couples between the output of this voltage divider network and ground terminal 30r to provide filtering. In addition, the output of the voltage divider network couples to a non-inverting input of an operational amplifier (op-amp) 64. Op-amp 64 is configured to operate as a non-inverting, unity gain amplifier, and resistors 58 and 60 are chosen so that the output from op-amp 64 provides a well filtered common reference potential which is one-half of the positive reference potential supplied at terminal 30s. The output of op-amp 64 couples to a common reference potential terminal 66. In addition, terminals 30s and 30r couple to power supply terminals of op-amp 64 and of op-amps 68, 70, 72, 74, and 76, discussed below (connections not shown).

Op-amp 68 and surrounding devices operate as a comparator circuit which forms switchhook status detector 50, discussed above in connection with FIG. 1. Specifically, positive reference potential terminal 30s couples to a non-inverting input of op-amp 68 through a resistor 76, which in the preferred embodiment has a value of 20K ohms. FIG. 2 shows bidirectional port 44 from FIG. 1 as including a signal line terminal 44s and a reference line terminal 44r. Positive reference potential terminal 30s couples through a resistor 78, which in the preferred embodiment also has a value of 20K ohms, to signal line terminal 44s. Common reference potential terminal 66 couples to reference line terminal 44r, and a resistor 80 couples between signal and reference line terminals 44s and 44r. In the preferred embodiment, resistor 80 has a value of 620 ohms. In addition, the non-inverting input of op-amp 68 couples through a resistor 82, which has a value of 330 ohms in the preferred embodiment, to common reference potential terminal 66, and signal line terminal 44s couples to an inverting input of op-amp 68 through a resistor 84. An ouput of op-amp 68 couples through a resistor 86 to a base of an NPN transistor 88. An emitter of transistor 88 couples to ground terminal 30r, and a collector of transistor 88 couples to switchhook terminal 34, discussed above in connection with FIG. 1.

The above-described switchhook status detection circuitry applies a switchable dc potential to signal line terminal 44s. As discussed above, when facsimile machine 10 (see FIG. 1) exhibits an on-hook state, it presents a substantially open circuit to dc current between signal and reference line terminals 44s and 44r. Thus, when facsimile machine 10 is on-hook, the inverting input of op-amp 68 receives a first dc potential. This first dc potential is defined by a resistor divider network consisting of resistors 78 and 80, which are coupled between the positive reference potential at terminal 30s and the common reference potential at terminal 66. The non-inverting input of op-amp 68 receives a substantially constant reference potential defined by a resistor divider network consisting of resistors 76 and 82, which are coupled between positive reference potential terminal 30s and common reference potential terminal 66. In the preferred embodiment of the present invention the value of resistor 76 approximately equals the value of resistor 78, but the value of resistor 82 is around one-half of the value of resistor 80. Consequently, when facsimile machine 10 (see FIG. 1) is on-hook, the inverting input of op-amp 68 receives a greater potential than the non-inverting input, the output of op-amp 68 is low, and transistor 88 is deactivated.

On the other hand, when facsimile machine 10 (see FIG. 1) is in the off-hook state, an impedance of around 600 ohms is applied in parallel across resistor 80, and the inverting input of op-amp 68 receives a voltage which is slightly less than the voltage applied at the non-inverting input of op-amp 68. Consequently, when facsimile machine 10 is off-hook, the output of op-amp 68 goes high, and transistor 88 activates.

Switchhook status detector 50 (see FIG. 1) additionally includes a low pass filter, which in the preferred embodiment is an integrator. Referring to FIG. 2, a capacitor 90 couples between the inverting input and the output of op-amp 68. In the preferred embodiment, resistor 84 has a value of 1M ohms and capacitor 90 has a value of 0.0047 $\mu$f. As a result, the integrator thus formed substantially blocks all audio frequencies and noise (or other forms of spurious signals) which may be present at signal line terminal 44s. Parenthetically, one type of "noise" blocked by resistor 84 and capacitor 90 is derived from the relatively high spectral component of the data that is present at terminal 44 during facsimile transmission or reception. As a result, the control signal applied at switchhook terminal 34 represents a more reliable indication of whether facsimile machine 10 (see FIG. 1) is in an on-hook or off-hook state.

In the preferred embodiment, receive port 42 (see FIG. 1) accomodates a differential audio signal at terminals 42s and 42r, as shown in FIG. 2. Terminal 42s couples through a series-connected combination of a blocking capacitor 92 and a resistor 94 to an inverting input of op-amp 76. Likewise, terminal 42r couples through a series-connected combination of a blocking capacitor 96 and a resistor 98 to a non-inverting input of op-amp 76. In addition, common reference potential 66 couples through a biasing resistor 100 to the non-inverting input of op-amp 76, and a feedback resistor 102 couples between an output of op-amp 76 and the inverting input of op-amp 76. Resistors 94 and 102 are selected so that a unity gain differential amplifier results. The output of op-amp 76 couples through a blocking capacitor 104 and a series-connected impedance device 56s, which in the preferred embodiment is a 620 ohm resistor, to signal line terminal 44s. Thus, a received signal applied at terminals 42s and 42r is buffered at op-amp 76 and resistively summed with the line signal that appears at signal line terminal 44s.

In addition, the output of op-amp 76 couples through a resistor 106 to an inverting input of op-amp 74. A feedback resistor 108 couples between an output of op-amp 74 and the inverting input of op-amp 74, and a non-inverting input of op-amp 74 couples to common reference potential terminal 66 for biasing. Resistors 106 and 108 are selected so that a unity gain, inverting amplifier results. The output of op-amp 74 couples through a blocking capacitor 110 and a series-connected impedance device 56r to signal reference terminal 44r. In the preferred embodiment, impedance device 56r represents a 620 ohm resistor. Capacitor 110 and resistor 56r provide isolation between the output of op-amp 74 and terminal 44r.

As discussed above in connection with FIG. 1, bidirectional port 44 couples to a first input of transmit amplifier 46. This is depicted in FIG. 2 by coupling signal and reference line terminals 44s and 44r to inverting and non-inverting inputs of op-amp 70, respectively. Specifically, terminal 44s couples through a blocking capacitor 112 and a series-connected resistor 114 to the inverting input of op-amp 70, and terminal 44r couples through a blocking capacitor 116 and a series-connected resistor 118 to the non-inverting input of op-amp 70. Moreover, a biasing resistor 120 couples between the non-inverting input of op-amp 70 and common reference potential terminal 66. In addition, an output of op-amp 70 couples through a feedback resistor 122 to the inverting input of op-amp 70. Thus, this first input of transmit amplifier 46 (see FIG. 1) forms a differential input.

The output of op-amp 74 supplies the second input to transmit amplifier 46 (see FIG. 1). Specifically, the output of op-amp 74 couples to the inverting input of op-amp 70 through a series-connected, balancing resistor 124. The output of op-amp 70 drives a signal terminal 38s of transmission port 38 (see FIG. 1) through a blocking capacitor 126 and a current limiting, series-connected, impedance device 48s. The output of op-amp 70 additionally couples to an inverting input of op-amp 72 through a resistor 128. Common reference potential terminal 66 couples to a non-inverting input of op-amp 72 for biasing, and a feedback resistor 130 couples between an output of op-amp 72 and the inverting input of op-amp 72. Resistors 128 and 130 are selected so that op-amp 72 forms a unity gain, inverting amplifier. The output of op-amp 72 drives a reference terminal 38r of transmission port 38 (see FIG. 1) through a blocking capacitor 132 and a current limiting, series-connected, impedance device 48r. In the preferred embodiment of the present invention, impedance devices 48s and 48r each represent 330 ohm resistors.

As discussed above, the line signal applied between terminals 44s and 44r includes both transmitted and received audio signal components. Isolation provided by resistors 56s and 56r causes an altered received signal output by op-amp 74 to reflect only the received signal output by op-amp 76 and not significant transmitted audio signal components. In the preferred embodiment of the present invention, the altered signal represents an inverted form of the received signal and exhibits substantially the same amplitude as the received signal. Thus, the received signal components of the line signal applied to terminals 44 and the altered signal applied to resistor 124 are of opposite polarity and tend to cancel one another out when summed together in op-amp 70.

In the preferred embodiment of the present invention, resistors 122 and 114 are chosen to establish a desired amplitude level for the transmitted audio signal appearing at transmission port terminals 38s and 38r. These resistors have values of 33K and 100K ohms, respectively, in the preferred embodiment. The value of resistor 124 is independently chosen so that the amplitude of the received signal component of the line signal differs from the amplitude of the altered signal applied through resistor 124 by a desired amount at the output of op-amp 70. In the preferred embodiment resistor 124 is a 27K ohm resistor whose value was selected empirically. Since these two signals are of opposite polarity, they add together to produce a resulting signal which has a reduced amplitude. Consequently, a "side tone" signal has been substantially reduced in the transmitted audio signal applied at transmission port terminals 38s and 38r. Of course, those skilled in the art will understand that the value of resistor 124 may be chosen so as to entirely remove the "side tone" signal rather than to merely establish it at a reduced, desired level.

Moreover, in the present invention op-amp 74 presents a very high impedance to the output of op-amp 76. Consequently, op-amp 74 in connection with resistors 106 and 108 have substantially no influence on the received signal produced by op-amp 76. As discussed above, resistors 122 and 114 may be adjusted independently of resistor 124 to establish the gain of the transmitted audio signal through op-amps 70 and 72. Thus, in the present invention resistor 124 may be adjusted independently of the transmitted and received signal gain path adjustments.

In summary, the present invention provides a circuit which converts two, independent, unidirectional ports into a single, two-line, bidirectional port. In addition, circuitry is provided which detects the switchhook status of facsimile machine 10 to control muting in CMR 14 (see FIG. 1). Interface circuit 12 and cable 26 together provide a simple circuit which is inexpensive to construct, reliable, requires only a minimal amount of space, and which allows facsimile machine 10 to successfully operate using CMR 14. Moreover, the present invention permits the successful operation of facsimile machine 10 and CMR 14 without requiring significant changes or modifications to either of facsimile machine 10 or CMR 14.

The present invention has been described above with reference to a particular preferred embodiment. However, those skilled in the art will recognize that changes and modifications may be made to this preferred embodiment without departing from the scope of the present invention. For example, those skilled in the art will recognize that the specific resistance and capacitance values discussed herein are subject to a wide range of modification without departing from the inventive concept presented herein. In addition, variable resistors could be employed in the present design to adjust various parameters, such as side tone cancellation, to an extent not possible with invariant resistor devices. Moreover, those skilled in the art may successfully modify the preferred embodiment discussed above to operate with single-ended signals rather than differential signals and to operate using two power supply rails rather than the single supply rail discussed above. These and other changes and modifications which are obvious to those skilled in the art are intended to be included within the scope of the present invention.

What is claimed is:

1. A circuit for adapting a telecommunications device having on-hook and off-hook states and a two-wire interface to a cellular mobile radiotelephone having an audio transmit interface, an audio receive interface, and a contact which controls cellular mobile radiotelephone muting, said circuit comprising:
   a two-wire bidirectional port for coupling to said telecommunications device two-wire interface;
   a transmit port for coupling to said cellular mobile radiotelephone audio transmit interface;
   a receive port for coupling to said cellular mobile radiotelephone audio receive interface;
   a switchhook terminal for coupling to said muting control contact;
   a first amplifier having an input coupled to said receive port and an output coupled to said bidirectional port, said first amplifier output supplying a received signal;
   a second amplifier having a first input coupled to said first amplifier output, a second input coupled to said bidirectional port, and an output coupled to said transmit port, said second amplifier being configured so that said received signal as amplified through said first input substantially cancels said received signal as amplified through said second input; and
   means, coupled to said bidirectional port and to said switchhook terminal, for detecting said off-hook state of said telecommunications device.

2. A circuit as claimed in claim 1 wherein said bidirectional port comprises signal and reference line terminals, and said circuit additionally comprises a first impedance device coupled between said first amplifier output and said signal line terminal.

3. A circuit as claimed in claim 2 additionally comprising:
   a first reference terminal adapted to receive a first reference potential;
   a second reference terminal adapted to receive a second reference potential and being coupled to said reference line terminal;
   a second impedance device coupled between said signal line terminal and said first reference terminal; and
   a third impedance device coupled between said signal and reference line terminals so that a first dc voltage appears across said bidirectional port when said telecommunications device is on-hook, and a second dc voltage appears across said bidirectional port when said telecommunications device is coupled thereto and is offhook.

4. A circuit as claimed in claim 3 wherein said detecting means comprises a comparator having an output coupled to said switchhook terminal, a first input coupled to said signal line terminal and a second input adapted to receive a third reference potential, said third reference potential being between said first and second reference potentials.

5. A circuit as claimed in claim 4 wherein said detecting means additionally comprises a low-pass filter coupled to said comparator for substantially removing spurious signals present at said bidirectional port.

6. A circuit as claimed in claim 4 additionally comprising:
   a fourth impedance device coupled between said second input of said comparator and said first reference terminal; and
   a fifth impedance device coupled between said second input of said comparator and said second reference terminal.

7. A circuit as claimed in claim 6 wherein:
   said second and fourth impedance devices are resistors exhibiting approximately equal resistance values;
   said first and third impedance devices are resistors exhibiting approximately equal resistance values; and
   said fifth impedance device is a resistor exhibiting a resistance value of around one-half of the resistance value exhibited by said third impedance device.

8. A circuit as claimed in claim 1 additionally comprising altering means, having an input coupled to said first amplifier output and having an output coupled to said second amplifier first input, for altering the amplitude of said received signal, said altering means having substantially no influence on said received signal at said first amplifier output.

9. A circuit as claimed in claim 8 wherein said altering means comprises a third amplifier which is configured to invert said received signal.

10. A circuit as claimed in claim 9 wherein said second amplifier comprises a differential amplifier having an inverting input and a non-inverting input, said inverting input being coupled to said bidirectional port and to said third amplifier.

11. A circuit for detecting an off-hook state of a remote telecommunications device which is coupled to a two-wire port having a signal terminal and a reference terminal, said circuit comprising:
   a supply terminal adapted to supply a first reference potential;
   a first resistor coupled between said signal terminal and said reference terminal;
   a second resistor coupled between said supply terminal and said signal terminal;
   a comparator having a first input coupled to said signal terminal and a second input adapted to receive a second reference potential, said second reference potential being between said first reference potential and a potential exhibited by said reference terminal.

12. A circuit as claimed in claim 11 additionally comprising:
   a third resistor coupled between said comparator second input and said supply terminal; and
   a fourth resistor coupled between said comparator second input and said reference terminal.

13. A circuit as claimed in claim 11 additionally comprising a low-pass filter coupled to said comparator for substantially removing spurious signals present at said two-wire port.

14. A method of adapting a line signal, to which a telecommunications device couples, into a transmitted audio signal, a received audio signal, and into a muting control signal, to which signals a cellular mobile radiotelephone transceiver couples, said method comprising the steps of:
   buffering said received audio signal to supply a received signal;
   driving said line signal with said received signal so that said received signal forms at least a component of said line signal;
   altering the amplitude of said received signal in a manner which has substantially no influence on said received signal, said altering step generating an altered received signal;
   adding said line signal to said altered received signal to produce a summation signal in which said received signal component of said line signal substantially reduces said altered received signal;
   driving said transmitted audio signal with said summation signal; and
   monitoring said line signal to determine an off-hook condition at said telecommunications device and to provide an indication of said off-hook condition for control of muting in said cellular mobile radiotelephone.

15. A method as claimed in claim 14 wherein said monitoring step comprises the steps of:
   applying a switchable dc potential to said line signal so that an on-hook dc voltage results when said telecommunications device is on-hook and an off-hook dc voltage results when said telecommunications device is off-hook; and
   generating a substantially constant dc potential at a value around said off-hook dc voltage; and
   comparing said line signal with said substantially constant dc potential.

16. A method as claimed in claim 15 wherein said monitoring step additionally comprises the step of filtering said line signal so that audio frequency components of said line signal are substantially blocked.

17. A method as claimed in claim 15 wherein said monitoring step comprises the step of filtering said line signal so that noise components of said line signal are substantially blocked.

18. A method as claimed in claim 15 wherein said monitoring step additionally comprises the step of filtering said line signal so that data-derived components of said line signal are substantially blocked.

19. An interface apparatus for coupling a facsimile machine to a control head associated with a cellular mobile radiotelephone (CMR) transceiver, the interface apparatus comprising:
   a two-wire, bidirectional port for coupling to the facsimile machine;
   a four-wire port for coupling to the control head, the four-wire port comprising a two-wire, unidirectional, RX port and comprising a two-wire, unidirectional, TX port; and
   muting means coupled between the two-wire, bidirectional port and the control head for providing a muting signal to the control head, which muting signal is developed in response to a predetermined operating condition of the facsimile machine so as to substantially effect the amplitude of a signal present at the RX port.

20. An interface apparatus for coupling a facsimile machine to a control head associated with a CMR transceiver as defined in claim 19 wherein the muting means comprises a resistive voltage divider coupled to the bidirectional port so that (i) a first dc voltage appears across said bidirectional port when said facsimile machine is off-line and (ii) a second dc voltage appears across said full duplex port when said facsimile machine is coupled thereto and is on-line.

21. An interface apparatus for coupling a facsimile machine to a control head associated with a CMR transceiver as defined in claim 20 wherein the muting means further comprises a comparator having an input coupled to the resistive voltage divider and an output coupled to the control head.

22. An interface apparatus for coupling a facsimile machine to a control head associated with a CMR transceiver as defined in claim 19 and further comprising:
   (a) a first amplifier having an input coupled to the RX port and an output coupled to the bidirectional port;
   (b) a second amplifier having an input coupled to the bidirectional port and an output coupled to the TX port; and
   (c) altering means coupled between the output of the first amplifier and the input of the second amplifier for determining the level of side tone provided during operation of the facsimile machine.

23. An interface apparatus for coupling a facsimile machine to a control head associated with a CMR transceiver as define in claim 22 wherein the altering means comprises a resistance.

24. An interface apparatus for coupling a facsimile machine to a control head associated with a CMR transceiver as defined in claim 22 wherein the muting means comprises a resistive voltage divider coupled to the bidirectional port so that (i) a first dc voltage appears across said bidirectional port when said facsimile machine is off-line and (ii) a second dc voltage appears across said bidirectional port when said facsimile machine is coupled thereto and is on-line.

25. An interface apparatus for coupling a facsimile machine to a control head associated with a CMR transceiver as defined in claim 24 wherein the muting means further comprises a comparator having an input coupled to the resistive voltage divider and an output coupled to the control head.

26. An interface apparatus for coupling a facsimile machine to a control head associated with a CMR transceiver as defined in claim 25 wherein the altering means comprises a resistance.

27. An interface circuit for interconnecting a two wire bi-directional port with both an audio transmit port and an audio receive port, comprising:
   receive amplifier means having an input coupled to the audio receive port and an output coupled to the bi-directional port for producing receive signals that contribute components of a signal present at the bi-directional port,
   transmit amplifier means having an input connected to the bi-directional port and an output coupled to the audio transmit port for producing a transmit signal, and
   altering means connected between the output of the receive amplifier and another input of the transmit amplifier for applying modified receive signals to the transmit amplifier whereby the receive signal components present upon different inputs to the transmit amplifier are reduced in the transmit signal produced by the transmit amplifier means.

28. The circuit of claim 27, further including:

muting means connected to the bi-directional port for detecting the status of a device interconnected to said bi-directional port and producing, selectively, a muting signal to another device interconnected to one of the audio ports.

29. A circuit as claimed in claim 27 wherein said means for altering comprises a third amplifier which is configured to invert said receive signals.

* * * * *